United States Patent
Dobozy

(10) Patent No.: US 6,722,593 B1
(45) Date of Patent: Apr. 20, 2004

(54) METHOD AND APPARATUS FOR RECOVERING AN ELASTOMERIC MATERIAL

(76) Inventor: John Dobozy, PO Box 5872, Gold Coast Mail Centre, Bundall, Q1d (AU), 4217

( * ) Notice: Subject to any disclaimer, the term of this patent is extended or adjusted under 35 U.S.C. 154(b) by 28 days.

(21) Appl. No.: 09/830,311
(22) PCT Filed: Oct. 6, 2000
(86) PCT No.: PCT/AU00/01218
§ 371 (c)(1),
(2), (4) Date: Apr. 25, 2001
(87) PCT Pub. No.: WO02/28609
PCT Pub. Date: Apr. 11, 2002
(51) Int. Cl.[7] ............................................. B02C 19/12
(52) U.S. Cl. ...................... 241/29; 241/159; 241/260.1
(58) Field of Search ................................ 241/159, 236, 241/DIG. 31, 29, 21, 15, 24.17, 260.1, 23

(56) References Cited

U.S. PATENT DOCUMENTS

| | | | |
|---|---|---|---|
| 4,613,087 A | * 9/1986 | Snyder | ........................ 241/111 |
| 4,685,628 A | * 8/1987 | Berrett | ........................ 241/236 |
| 5,304,576 A | 4/1994 | Martinez | |
| 5,316,224 A | 5/1994 | Dobozy | |
| 5,611,492 A | 3/1997 | Hunt et al. | |
| 5,677,354 A | 10/1997 | Lima | |
| 5,927,627 A | * 7/1999 | Edson et al. | ................. 241/159 |
| 6,311,908 B1 | * 11/2001 | Kajiyama et al. | .............. 241/29 |

FOREIGN PATENT DOCUMENTS

DE 33 13 470 A1 10/1984

\* cited by examiner

*Primary Examiner*—Mark Rosenbaum
(74) *Attorney, Agent, or Firm*—Silicon Valley IP Group, PC; Dominic M. Kotab

(57) ABSTRACT

A method for recovering elastomeric material such as rubber from tires comprising the steps of soaking the tires in a mixture of an oil and a volatile solvent to soften the rubber, subjecting the softened tires to shear conditions in a separator having at least two pairs of counter rotating rollers mounted one above the other. The recovered rubber can be carbonized in a microwave chamber to produce carbon and oil.

28 Claims, 8 Drawing Sheets

METHOD AND APPARATUS FOR RECOVERING AN ELASTOMERIC MATERIAL

The present invention relates to a method for processing waste elastomeric material to recover the material and optionally to de the elastomeric material so as to recover materials such as carbon and volatile hydrocarbon products. The method of the invention is particularly suitable for recovering materials from vehicle tires.

BACKGROUND OF THE INVENTION

The present invention will be described with particular reference to the treatment of used vehicle tires, however it will be appreciated that the methods and apparatus described herein may also be suitable for the treatment of other articles containing elastomeric materials, such as conveyor belts, and no limitation is intended thereby.

Vehicle tires are typically formed from synthetic and natural rubber materials together with carbon black, plasticizers together with steel reinforcing wires, metal beads at the inner diameter of the tire and fibers formed from nylon or polyester.

Used vehicle tires are commonly disposed of by dumping to landfill. However, dumps of old tires are undesirable for environmental reasons. They take up large amount of space and can be a fire hazard. Also, in view of the costs of manufacture of rubber it would be desirable to be able to recycle the rubber in used tires. Methods which have been proposed to dispose of used tires include simply slicing the tires to reduce the large volume of tire dumps. Used tires may also be ground to produce rubber crumb which may be used in the production of rubber flooring, roads, sports surfaces and other rubber products. Typically, the steel wires and beads are magnetically separated from the crumb during granulation and the fiber separated by flotation systems. Generally, the tires are subjected to an initial slicing or shredding step with the steel and fiber intact. Slicing and shredding of the steel requires additional energy and leads to high wear and tear on slicing and shredding blades.

Another approach has been to carbonize the tires to produce breakdown the rubber to products such as carbon black and fuel oil. Generally, the tires are carbonized whole and the steel is separated afterwards. A disadvantage of heating whole tires is that the carbon and fuel oil, end products can be contaminated by wire and breakdown products of the fibers.

Separation of rubber from reinforcement materials in vehicle tires may be facilitated by first softening the rubber with a solvent followed by subjecting the tire to shear conditions to separate the rubber from the reinforcing materials. However a disadvantage of softening the rubber with solvents is that large volumes of solvents are required. This adds to costs together with the associated health, safety and environmental hazards associated with handling and ultimately disposing of large amounts of solvents. An example of such a process has been described in U.S. Pat. No. 5,316,224 in which material from waste tires was soaked in vats containing solvent for between about 5 to about 6 hours.

Attempts have also been made to reclaim carbon and volatile products from waste rubber by heating the rubber in the absence of oxygen to high temperatures in a microwave. A disadvantage of this process is that although rubber absorbs microwave energy it is a poor conductor. This results in uneven heating of the rubber. This uneven heating can have an adverse effect on the quality of the final product as it may be contaminated by combustion products or products resulting from incomplete carbonization.

It is therefore an object of the present invention to provide a method and apparatus for recovering an elastomeric material from an article containing that material or to provide the public with a useful or commercial choice.

According to a first broad from of the invention, there is provided a method of recovering elastomeric material from an article containing the material, the method including softening the elastomeric material by contacting the article with a fluid comprising an oil in admixture with solvents to soften the elastomeric material and subjecting the softened material to a shearing force to recover the elastomeric material.

Articles containing such elastomeric material suitably include vehicle tires, conveyor belts, rubberized fabrics, and elastomeric materials reinforced with metal, wires, filaments and the like.

The article containing the elastomeric material may be required to be precut or shredded to a processable size. Thus, vehicle tires are debeaded and sliced or coarsely shredded by any conventional shredding apparatus.

Suitable elastomeric materials include those capable of being softened by absorbing liquids into the elastomeric material. These materials may include synthetic or natural rubbers, modified rubbers, vulcanized rubbers, neoprenes, isoprenes, compositions of natural or synthetic rubbers, homopolymers or copolymers of conjugated diene hydrocarbons, homopolymers or copolymers or chloroprene, carboxylated rubbers, halogeneated rubbers, silicones, ABS elastomers, EP and EPT rubbers, cross-linked, graft, block or interpenetrating elastomers.

Suitably, the solvent is selected from hydrocarbons, nitrohydrocarbons, alcohols, ethers, ketones, esters, glycols and glycol ethers, cycloalkyl alcohols, esters and ketones, chlorinated hydrocarbons, cyclic ethers and aldehydes and mixtures thereof.

Preferred solvents in these classes include benzene, toluene, xylene, tetrohydronaphthalene, decahydronaphtalene, dipentene, petroleum liquids, naphtha liquids, nitropropane, methyl alcohol, ethyl alcohol, N-propyl alcohol, N-butyl alcohol, isobutyl alcohol, sec-butyl alcohol, amyl alcohol, benzyl alcohol, diacetone, diethyl ether, diisopropyl ether, acetone, methyl isobutyl ketone, methyl acetate, ethyl acetate, N-butyl acetate, amyl acetate, hexyl acetate, amyl formate, ethyl lactate, butyl glycollate, methyl benzoate, butyl stearate, dimethylphthalate, dibutylphthalate, dibutylsebacate, methylabietate, ethylene glycol, ethylene glycol monomethyl ether, ethylene glycol monoethyl ether, ethylene glycol ethyl ether acetate, ethylene glycol monobutyl ether, ethylene glycol ethyl ether acetate, ethylene glycol monobutyl ether, diethylene glycol, diethylene glycol monoethyl ether, propylene glycol, cyclohexanol, cyclohexanol acetate, cyclohexanone, methyl cyclohexanone, methylene dichloride, chloroform, carbon tetrachloride, dichloroethane, perchloroethane, dichloroethylene, trichloroethylene, perchloroethylene, mono chlorobenzene, dichloroethylether, 1,1,2,-trichlorotrifluroethane, dioxane and furfural.

Preferred solvents include toluene and xylene used alone or in mixture with each other or with other liquids. Other preferred liquids include Shellsol A, Shellsol 1021 and water. The preferred liquids may be mixed with inert liquids of high boiling point such as halogenated hydrocarbons.

Small proportions (5–11%) of inert hydrocarbons such as trichloroethylene, 1,1,1-trichloroethylene or carbon tetrachloride may also be added.

The solvent may also include waste solvents from industries such as the automotive and paint industries. It has been surprisingly found that impurities in these waste solvents does not adversely affect the ability of the liquid mixture to soften the elastomeric materials. Typical waste solvents include a mixture of aromatic solvents such as toluene, xylene and benzene.

The oil may include any suitable oil or mixture thereof. Suitable oils include engine oil, grease, coal oil, fuel oil, paraffin oil, mineral oil and oils derived from plants or animals. An especially preferred oil is that obtained as a product of destructive distillation of an elastomeric material or as a byproduct of carbonization of the tires. Typically such an oil, comprises limonene, other saturated hydrocarbons and aromatic compounds.

Typically the fluid mixture comprises between about 50 to about 90vol % oil and preferably between about 60 to about 80vol %.

In the method of the invention, the article containing the elastomeric material is contacted with the fluid for a time sufficient to soften the material. The material is typically softened to a degree whereby the subsequent shearing step may be carried out efficiently. By way of example, rubber from a vehicle tire typically has a shore hardness of about 60. It is desirable that this shore harness is reduced to between about 25 to about 35 by softening in the fluid.

The present inventor has surprisingly and unexpectedly found that by using a fluid comprising a mixture of a solvent and an oil that the amount of fluid required to soften the material to the desired degree can be significantly reduced compared with the amount of fluid required when using solvent alone. For example, the present inventor has observed that by using a prior art process such as that described in U.S. Pat. No. 5,316,224 rubber from a used vehicle tire must absorb between about 30 to about 50% of its weight of solvent before reaching a desired degree of softness. On the other hand, by using the method of the present invention it may be possible to reduce the amount of fluid required to soften rubber in a vehicle tire to less than about 30% by weight of the rubber.

The oil distilled from tires is an especially preferred medium to carry the chemical compounds into the rubber, weakening the chemical bonds by the softening process. This compound I have named "Soloil". Whilst not wishing to be bound by theory, it is believed that the "Soloil" and other suitable oils, when entered into the molecular structure of the rubber (natural/synthetic, styrene/butadiene, chlorinated cyclized/semicyclized and/or any other rubber compounds) elongates the bonds, weakening them, thus lowering the resistance of rubber to mechanical forces with much reduced energy requirements. The solvent component of the Soloil acting on the rubber does not dissolve it, but simply enlarges the molecular structure until the solvents are extracted again. It has been found that if a volatile oil is mixed with volatile solvents, the boiling point of the mixture is reduced. It is believed that the azeotropic blend has an increased solvent power as the viscosity of the mixture is increased, thus the use of oil reduces the need to use large quantities of solvents. Obviously, when waste solvents/chemicals are plentiful, the tire recycling system can assist in a responsible and controlled use of the product (rather than dumping) then this invention accommodates that activity.

The following table relates to the viscosity of the blends of workable proportions at 15° C. It's obvious that a number of various recipes can be applied.

TABLE 1

| Component A | Component B | Component C | Proportions | Viscosity $mm^2/SEC$ (approximate) | No. |
|---|---|---|---|---|---|
| Tire Oil | Solvent Blend | — | 60:40 | 0.674 | 29 |
| Tire Oil | Solvent Blend | Toluene | 75:20:5 | 0.702 | 18 |
| Tire Oil | Solvent Blend | Xylene | 70:25:5 | 0.708 | 17 |

VISCOSITY at 15° C.

Compound B is a waste industrial solvent which contains at least some xylene and/or toluene.

As in the first invention as described in U.S. Pat. No. 5,316,224, I selected a number of solvents which are non-polar (the soak-attraction time to the structure of the rubber was rather long), with the improvements by mixing selected solvents with oil they become polar, subsequently the attraction forces are increased without the need of raising the temperature or pressure or both.

In the case of vehicle tires, it is preferred that the tires are debeaded and sliced or chopped before being subjected to soaking. Apparatus and methods for debeading, slicing and chopping used vehicle tires are known and commercially available.

In an especially preferred embodiment, there is provided a method of softening an article containing an elastomeric material, the method including placing the article in a closed vessel containing a fluid which can absorb into and soften the material, whereby the vessel has an inlet at a first end and an outlet at a second end and the article passes through the vessel from the inlet to, the outlet for a time sufficient to soften the elastomeric material.

Typically, the article passes from the inlet to the outlet under the influence of gravity, in which case the vessel is inclined such that the inlet is above the outlet. In this case, the articles may be automatically agitated as they cascade downwards towards the outlet. Typically, vessel is a pipe or conduit (which I named a cascading duct system). The residence time in the vessel may be dependent upon the length of the vessel. A typical residence time for vehicle tires is up to about 4 hours. A typical vessel used for treating used vehicle tires is a conduit between about 500 m to about 2,000 m in length. The vessel need not be linear and typically has a repeating S or spiral shape.

If desired, the vessel may be subjected to heating and/or pressure.

It is preferred that the fluid is an oil solvent mixture as described above. However, a fluid such as a solvent mixture as previously described in U.S. Pat. No. 5,316,224 may also be used. However, in this case, the residence time in the vessel may need to be increased.

Typically when the articles reach the outlet the articles are separated from the fluid and the excess fluid is filtered and recycled.

According to a further broad from of the invention there is provided an apparatus for treating an article containing an elastomeric material, the apparatus including a closed vessel containing a fluid which can absorb into and soften the elastomeric material, the vessel having a first end having an inlet and a second end having an outlet, whereby the article passes from the inlet to the outlet for a time sufficient to soften the elastomeric material.

Typically the apparatus further includes means for recycling excess fluid from the outlet to the inlet. Typically the apparatus also includes collection means for collecting and recycling vapors from volatilized fluid in the apparatus.

After softening, the article is subjected to a shearing force, which can separate the elastomeric material in the article from non-elastomeric material such as wire and fibre tire reinforcement. One suitable shearing means is that described in U.S. Pat. No. 5,316,224.

An especially preferred device for shearing the softened material includes at least two pairs of counter rotating rollers, each roller having a spirally configured flight, whereby the pairs of rollers are mounted one above the other and the gap between the rollers in a respective pair is largest for the uppermost pair of rollers and in use material to be sheared passes sequentially from the upper to the lowermost pair of rollers.

The rollers compress and twist the softened elastomeric material which results in separation of the elastomeric material from any non-elastomeric material in the article. Where the article is a vehicle tire, the rollers separate the rubber from the wire and fibers of the tire reinforcement. The number of rollers is typically dependent on the volume and type of the elastomeric material. For processing rubber tires, the shearing device typically includes four pairs of counter rotating rollers. Typically, the gap between the uppermost pair of rollers is between about 6 to about 7 mm. The next three pairs of rollers typically have gaps of between about 4 to about 5 mm, between about 2 to about 3 mm and less than 1 mm respectively.

It has been surprisingly discovered that by providing at least two pairs of rollers with different gaps between the rollers in a respective pair that a more efficient action for separating elastomeric material from non-elastomeric material such as wire reinforcement can be achieved.

Where the article includes wire reinforcement, the device typically further includes magnetic separation means for separating any metal from the elastomeric material.

Rollers having screw flights typically have a directional action which transfers material along the flight. In some cases, this may lead to excess material being carried to one end of the roller where it is unable to be processed effectively. It is therefore preferred that the rollers are mounted at an angle to the horizontal such that the direction of rotation pushes the material in an uphill direction. In this way gravity is used to at least partially counteract the directional movement of the roller.

Alternatively, or in addition to mounting the rollers at an angle, the rollers may be manufactured such that each half of a roller has a forward and backward directional movement. This can be accomplished by changing the flight angle midway along the roller.

The typical measurement of any two working augers is: pitch (90 mm–120 mm), gradient (42°–48°), depth (50 mm–85 mm), length (1500 mm), diameter (400 mm–600 mm) and working surface area of approximately between about 1.0 and about 1.8 m$^2$, preferably about 1.4 m$^2$ per set of augers.

Typically, the shearing device further includes means for removing any of the fluid mixture, which may be volatilized during the shearing process. Typically, fumes are removed by vacuum and collected in liquid form. This liquid may be recycled to the soaking step.

The softened elastomeric material may be collected and part or all of the absorbed fluid may be removed. Removal of the absorbed fluid may be carried out by a variety of suitable techniques including rotary kiln drying, radiation drying such as microwave drying and/or squeeze drying. Where the elastomeric material has been softened with an oil/solvent mixture and the material to be subjected to carbonization by microwave irradiation, it is preferred that at least some of the oil remains in the material. This will be referred to in further detail below.

If desired the elastomeric material which has been separated from the non-elastomeric material is subjected to size reduction. Softening of the elastomeric material typically results in swelling which increases the size of a piece of material. Thus, slicing or grinding can be facilitated by the increase in size as compared to grinding or slicing a shrunk piece of rubber. Typically, the material is reduced to particles having an average size of below about 100 mesh.

The elastomeric material may be ground in grinders which are known in the art. However, it is preferred that a grinder further includes a screw auger located within an elongated housing. As the auger rotates inside the housing it turns cutting blades which cut the rubber. The screw auger drives the material forward and compresses it against perforated plates. Rotating blades slice the material and when the material reaches a certain particle size, the particles can escape through the holes in the perforated plate. As a result of compression and friction generated during this process heat is generated. It is therefore desirable that the grinder further includes a cooling system. A typical cooling system includes an external cooling jacket which may be built into the housing and/or internal cooling at the center of the auger. Typically any fumes generated during granulation are removed by vacuum and may be collected and recycled to the soaking step.

The ground elastomeric material may then be treated to at least partially remove the fluid. Typically, the ground material is heated either under vacuum or ambient pressure. The liquids are typically collected and may be recycled to the soaking step. The ground elastomeric material is typically suitable for use in floortiles, sports surfaces, roads and other uses to which conventional types of ground rubber may be applied.

The ground product is particularly suited to degradation by carbonization produce commercial products such as fuel oil and carbon black. Preferably, the ground product is carbonized using microwave energy. A suitable source of microwave energy may be a microwave reactor as described in U.S. Pat. No. 5,316,224.

Typically, the microwave reactor includes a chamber with a first inlet for introducing the elastomeric material into the chamber, an outlet for removal of solid degraded products, a second inlet to allow microwave radiation to enter the chamber and a second outlet for removal of volatile materials from the chamber.

Typically, the chamber is rotatable to facilitate mixing of the material so as to provide a more even energy distribution. It has been observed that by providing uniform heating the percentage of carbon in the total degradation products may be optimized. Alternatively, the microwave reactor may include an internal mixer which may be in the form of a rotating blade or fin. The mixer may be made from stainless steel or other suitable material. Preferably, the mixer is interactive with the electromagnetic radiation to vary the electromagnetic distribution pattern within the chamber.

Preferably, the chamber is tubular with rounded ends. The absence of sharp comers in the curved interior surface reduces the likelihood of arcing or "hot spots". Furthermore, such a configuration facilitates the calculation of modes (filed configurations) within the chamber.

The microwave reactor includes an outlet through which volatile degradation products can be removed. Typically, the chamber is connected to a vacuum pump to facilitate removal of volatile products. The vacuum environment prevents burning (oxidising) and under our vacuum system, the pollution potential is totally eliminated. The reactor typically further includes means for condensing and isolating the volatile product.

The reactor may also include a temperature sensor at several locations to monitor the internal temperature, the temperature of the product and extract the volatiles from that product by identifying the temperature signatures of each component, assisting us to evaporate and condense each component.

Typically, the reactor further includes an inert gas inlet to introduce inert gas into the chamber if needed.

The reactor includes an inlet for introducing microwave radiation into the chamber. Typically the microwave inlet is covered by a plate on which several waveguide terminations are provided. Each waveguide termination is connected to a respective source of microwave energy, such as a magnetron, via a transmission waveguides. Each waveguide termination is located over a respective aperture in the plate, but a ceramic window pressure plate may be placed across the waveguides interface to preserve the sealed nature of the reactor, The number and power rating of the magnetrons can be varied to suit the particular application. Preferably, the number of modes from each magnetron is relatively high. Due to the large number of modes and magnetrons, a relatively uniform energy pattern may be obtained in the reactor.

An outlet is provided for removal of solid by-products which is typically carbon. Generally, the outlet is located on a lower floor of the chamber and is closed by a retractable sliding door. A conveyor may be located below the outlet.

Although rubber absorbs microwave energy it is a poor conductor. This can lead to a relative slow rise in temperature, uneven heating and in some cases overheating and combustion. For example, when a ground sample of an untreated rubber from a used tire was subjected to microwave radiation, that 2450 MHz the temperature rise was observed to be about 6.2° C./s for tire tread and about 2.1° C./s for the side wall of the tire. This slow temperature increase can result in long microwave residence times and relatively large amounts of microwave energy required to carbonize the rubber. This can lead to an increase in costs. Whilst not wishing to be bound by theory it is believed that at the carbonization phase, the introduced chemical and oil components of the rubber (which made the rubber polar) created a dipole moment which assists in the rise in temperature by easier acceleration of molecules within the rubber generated by the microwaves. For economical reasons it is of course desirable that the value of the input energy is less than the value of the final products.

The present inventor has surprisingly and unexpectedly discovered that an elastomeric material subjected to the softening process of the present invention has an increased temperature rise when subjected to microwave radiation as compared to untreated rubber. It has been observed that irradiation at a microwave frequency of 2450 MHz the temperature rise of tire rubber can be up to about 36.9° C./s. Whilst not wishing to be bound by theory, it is believed that trace amounts of the oil used in the softening solution facilitates conduction of the microwave energy through the elastomeric material.

The present inventor has also surprisingly and unexpectedly discovered that the effectiveness of the microwave heating step can be improved by pre-heating the elastomeric material to before prior to microwave radiation. Typically, the elastomeric material is pre-heated to between about 80 to about 150° C., preferably between about 90 to about 120° C. At this temperature, residual fluids used in the softening step will normally volatilize. Typically, the volatilized products are exhausted, from the heating zone, separated if desired and isolated. The isolated products may be recycled to the softening step. Alternatively, these chemicals may be subjected to further separation and for use in other applications.

According to a further broad from of the invention there is provided a method of carbonizing an elastomeric material, the method including preheating the elastomeric material to a temperature below which carbonization is initiated before heating the pre-heated material by exposing the material to microwave radiation to a temperature at which carbonization occurs.

Typically, the elastomeric material is heated in the microwave chamber to temperatures between about 900 to about 3000° C., typically about 1300° C. The elastomeric material is carbonized to produce a carbon product together with volatilized products and gaseous products. These products are removed from the chamber under vacuum and isolated. Sulfur and zinc oxides are vaporised and condensed into solids.

It has been observed that the carbon product obtained has a high carbon content, typically above 90%. If desired, the carbon product may be further purified by acid washing.

BRIEF DESCRIPTION OF THE FIGURES

FIG. 1 illustrates a preferred apparatus 11 according to an embodiment of the invention for softening an elastomeric material. The apparatus 11 has a loading unit 12 for loading elastomeric material and a solution tank 13 for controlling the supply of fluid to the apparatus. The loading unit 12 and solution tank 13 are mounted on a gantry 14. Extending from the loading unit 12 is a pipeline 16 having an inlet fluidly connected to the loading unit 12 and has an outlet at terminates at a process terminal 17. The pipeline has a zigzag spiral configuration from the front view and an S shaped configuration in plan view (as shown in FIG. 2). The pipeline 16 is about 200 m–1000 m in length.

FIG. 3 shows a detail of the loading unit 12. The unit has a main chamber 18 with a loading manhole 19 in the top wall thereof. The unit has a feed hopper screw mechanism 20 which feeds elastomeric material from the chamber 18 into the inlet 21 of pipeline 16.

FIG. 4 shows the solution tank 13 in detail. The tank 13 has first inlet 22 for receiving virgin fluid and a second inlet 23 which receives solvent recycled from the process terminal 17. A mixing chamber 24 is located below and fluidly connected to tank 13. A valve 25 can control the supply of fluid to the mixing chamber 24. A screw conveyor 26 feeds the elastomeric material through the mixing chamber 24.

FIG. 5 is a detail of the process terminal 17. The terminal has a chamber 30 which is fluidly connected to the end 31 of pipeline 16. Within chamber 30 is an inclined screen 32 for separating the softened elastomeric material from the fluid. The separated fluid is returned to the solution tank 12 by means of pump 33 and return conduit 34. (shown in FIG. 1).

In practice, vehicle tires which have been debeaded and sliced are loaded into loading unit 12 which introduces sliced tires into pipeline 16. A fluid is then introduced into pipeline via solution tank 13. The sliced tires are pushed forwards by the actions of the respective screw conveyors and when mixed with the fluid pass down the pipeline under the influence of gravity. The sliced tires remain in the pipeline for a time sufficient so that they are softened to a desired level, typically to about a shore hardness of between about 25 to about 35.

It has been observed that by softening tires using this apparatus it has been possible to achieve much more efficient and uniform softening of rubber pieces when compared to the conventional vat soaking technique. One disadvantage of the vat soaking process is that the rubber pieces at the bottom of the vats are softened to a greater degree than the rubber pieces at the top of the vat. Although this disadvantage may possible be overcome by providing agitating means in the vats, this would be impractical from an economic point of view.

After the softened rubber has been separated from the solvent, the rubber is separated from the steel wires and fibers from the rubber.

Figure 1:
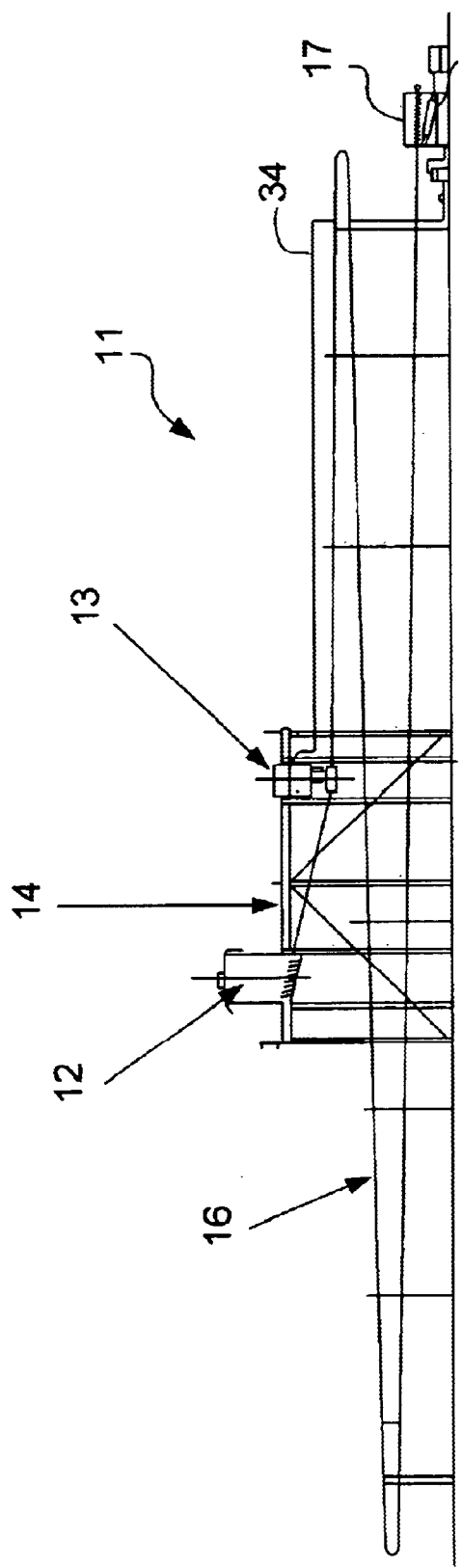
FIG. 1 is a schematic front view of a preferred apparatus for softening an elastomeric material according to an embodiment of the invention.
Figure 2:
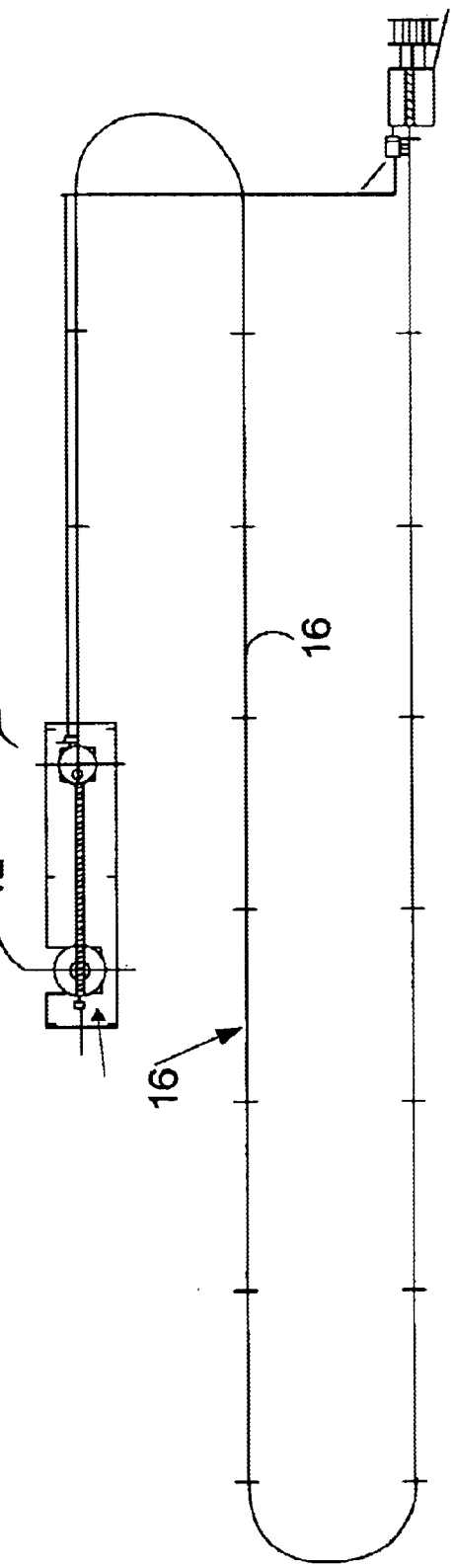
FIG. 2 is a plan view of the apparatus of FIG. 1.
Figure 3:
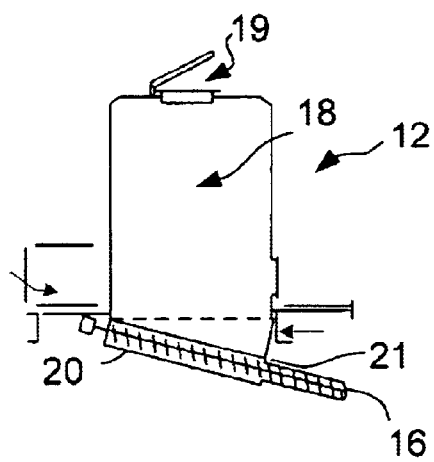
FIG. 3 is a detail of part of the apparatus of FIG. 1.
Figure 4:
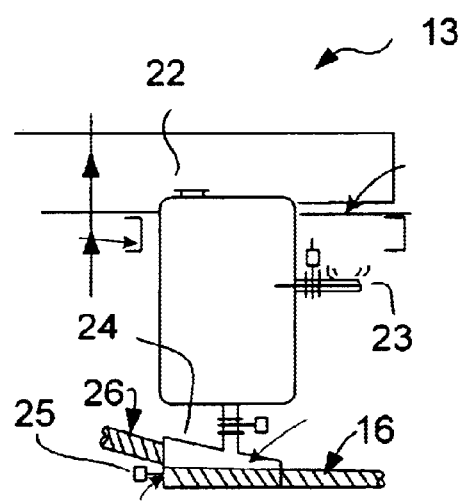
FIG. 4 is a detail of part of the apparatus of FIG. 1.
Figure 5:
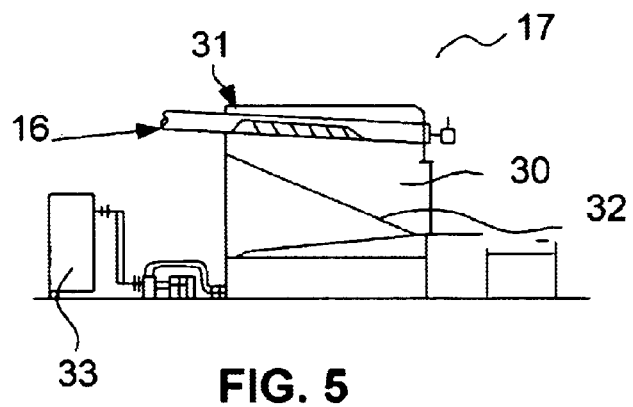
FIG. 5 is a detail of part of the apparatus of FIG. 1.
Figure 6:
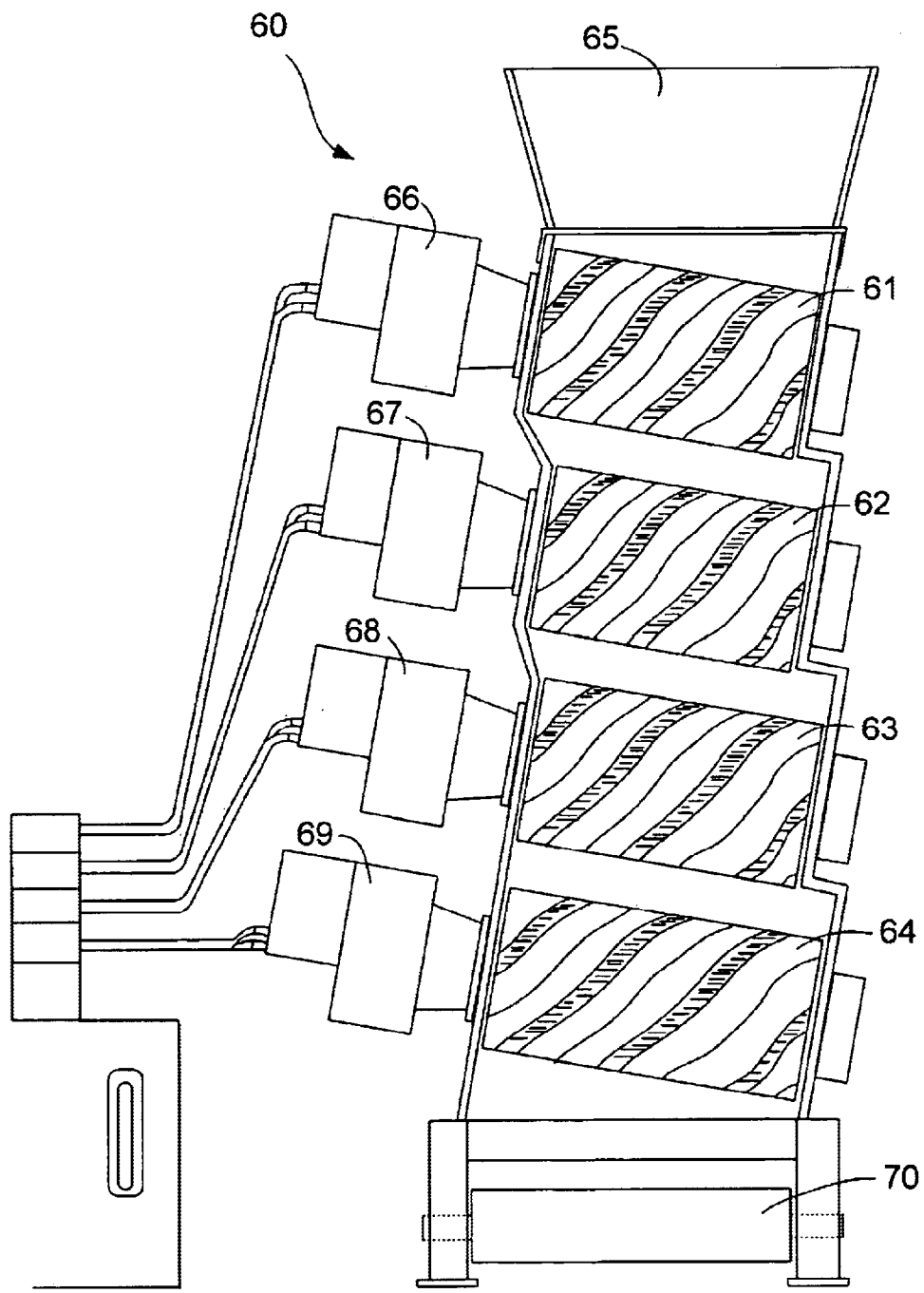
FIG. 6 is a schematic view of a preferred separator of an embodiment of the invention.
Figure 7:
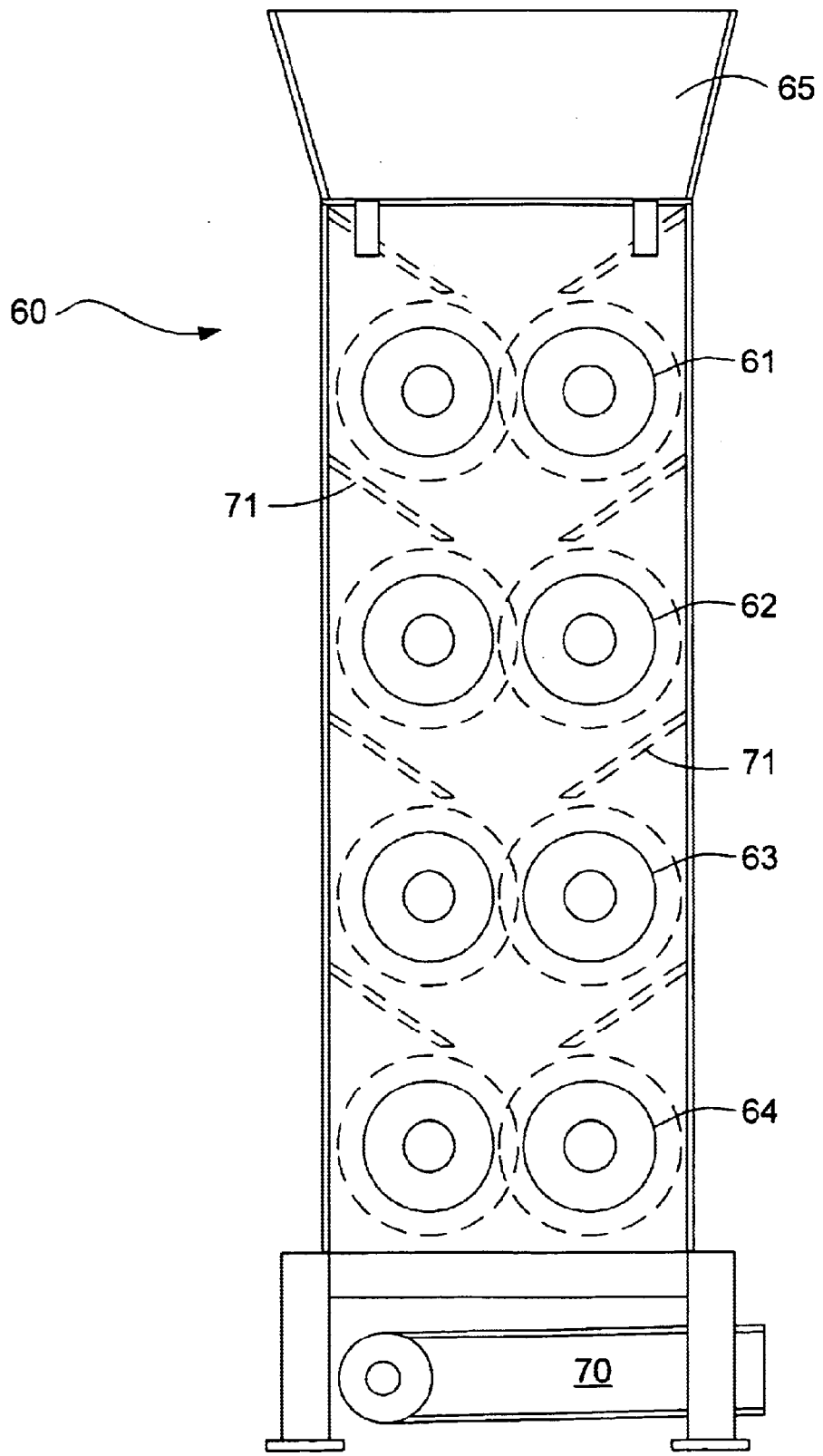
FIG. 7 is a front view of the separator of FIG. 6.

A preferred separator 60 is illustrated in FIGS. 6 and 7.

The separator 60 has four pairs of counter rotating rollers 61, 62, 63, 64 mounted one pair above the other. The rollers are driven by hydraulic motors 66, 67, 68, 69. The top roller 61 is fed by a hopper 65. The top roller 61 is provided with a load sensor which can detect if the roller is overloaded. In this case, the rotation of the rollers is stopped and reversed for a short period of time. The rollers have a spirally configured flight. The counter rotating rollers both twist and compress the chunks of tires. This action causes the three components of the tires, i.e. the rubber, reinforcing wires and fibers to separate.

The gap between the rollers decreases from the top 61 to the bottom 64 pairs of rollers. The distance between the rollers is about 6 to about 7 mm, about 4 mm, about 2 mm and less than about 1 mm from the top to the lower pair of rollers respectively. By having a number of rollers with a decreasing gap it has been found that the efficiency of separation can be significantly improved over conventional separating methods. An example of an earlier method is a screw conveyor mounted within a housing as described in U.S. Pat. No. 5,316,224. In this earlier device the screw conveyor compresses the tires against the inner walls of housing. This can result in a significant pressure build up within the housing.

An advantage of having the rollers mounted above each other is that each roller is fed by the roller pair located immediately above. Guides 71 are provided to guide material to the next roller pair. In this way, the tires chunks are subjected to a series of twisting and squeezing actions. Below the lowermost roller pair 64 is a magnetic separator 70 which can pick out the reinforcing wire together with entangled fibers.

The roller pairs are each mounted at an angle. Rollers having a screw flight have a directional action whereby material is driven towards one end of the roller. This can decrease the efficiency of the action as excess material may build up at one end of the rollers and/or the material may imply idle at the ends of the rollers without being squeezed. The rollers are mounted at an angle such that the normal directional action of the rollers is to push the material uphill. In this way, gravity may be used to at least partially counteract the directional action of the roller screws.

Figure 8:
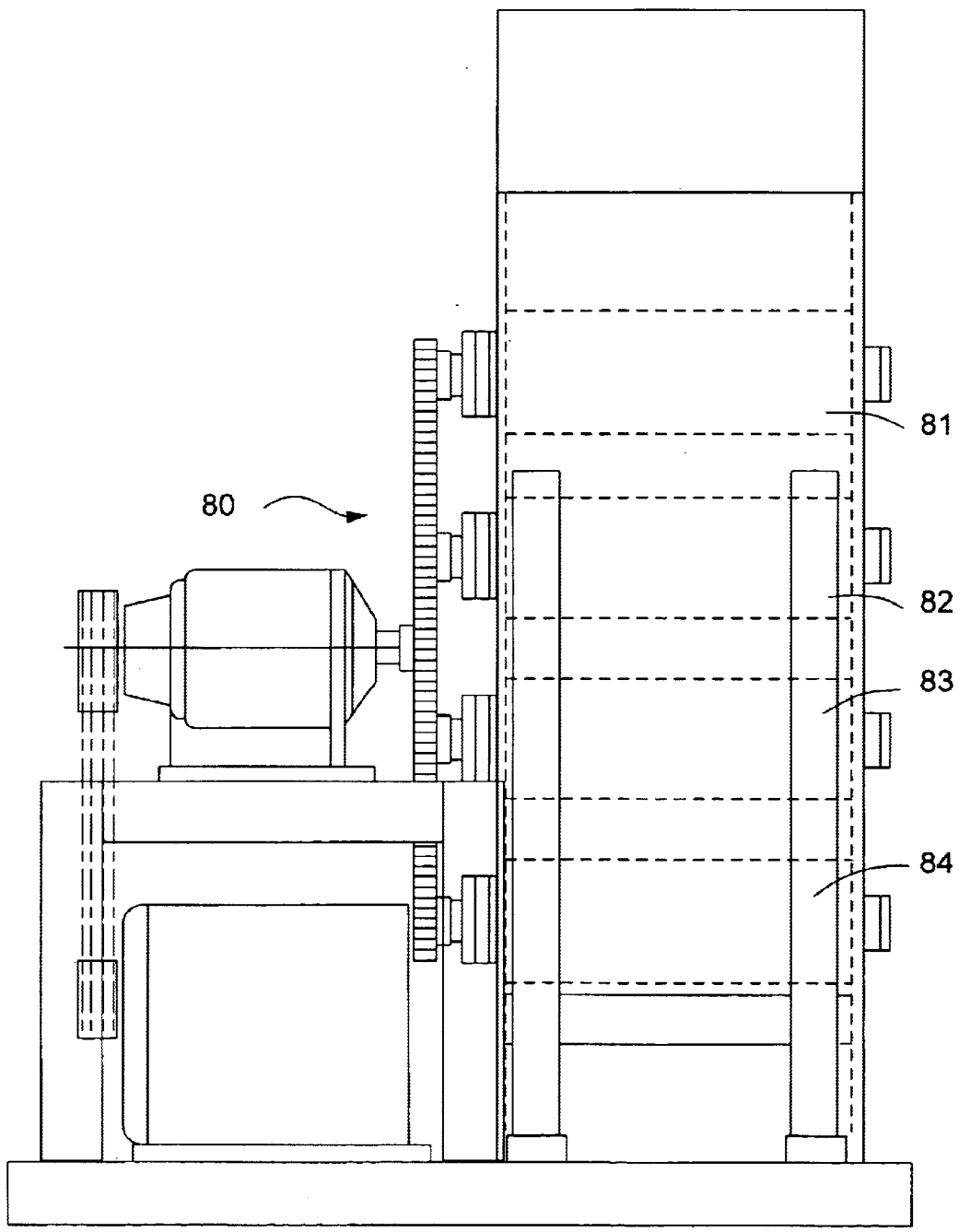
FIG. 8 is a schematic view of a further preferred separator of an embodiment of the invention.
Figure 9:
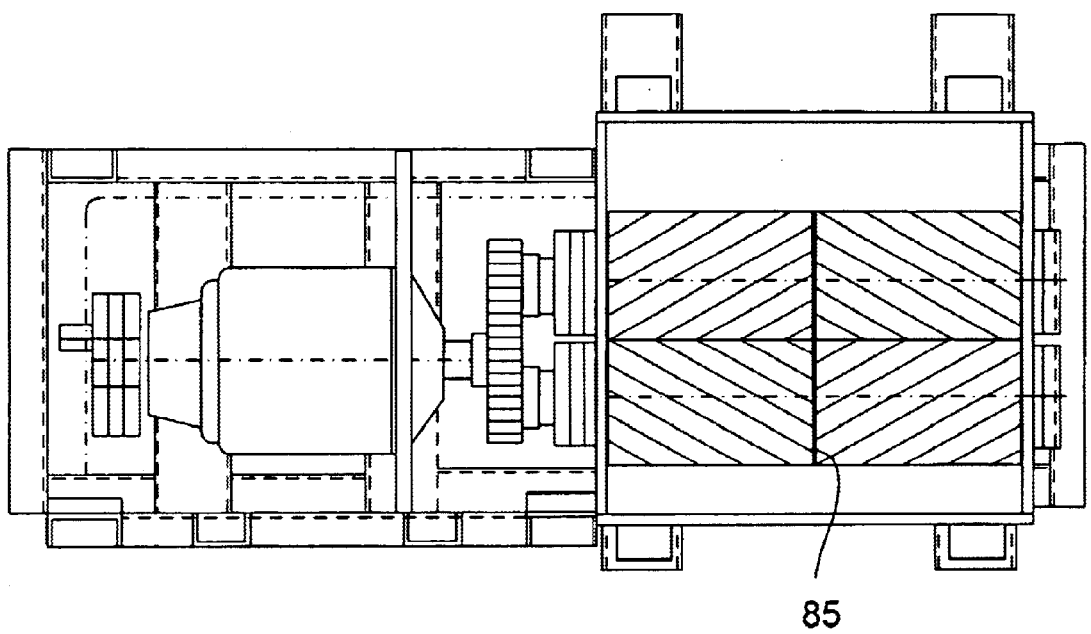
FIG. 9 is a plan view of the separator of FIG. 8.

FIGS. 8 and 9 illustrate a further preferred separator 80. This separator 80 also includes four pairs of counter rotating rollers 81, 82, 83, 84 mounted above each other. These rollers are mounted in a horizontal manner. The rollers also have a screw flight. However, the direction of the screw changes at the midpoint 85 of each roller. In this way, the directional action of the rollers is to push material being squeezed towards the center of the rollers as opposed to the edges. This enables the rollers to be mounted horizontally.

The gaps between the rollers are the same as those referred to above.

Figure 10:
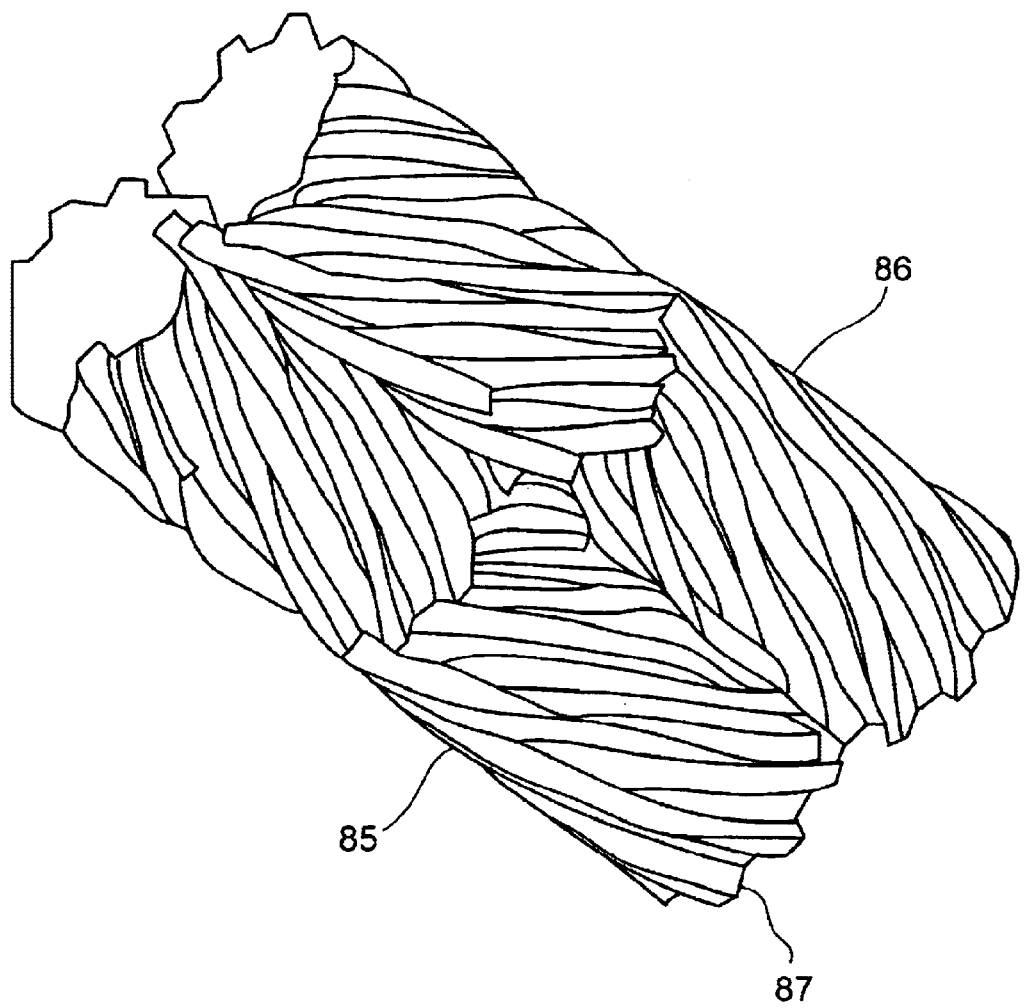
FIG. 10 is a schematic view of a pair of rollers from the separator of FIGS. 8 and 9 and FIG. 11 is a schematic view of a microwave reactor according to a further preferred embodiment of the invention.

FIG. 10 illustrates schematically, a preferred pair of rollers 86, 87.

Figure 11:
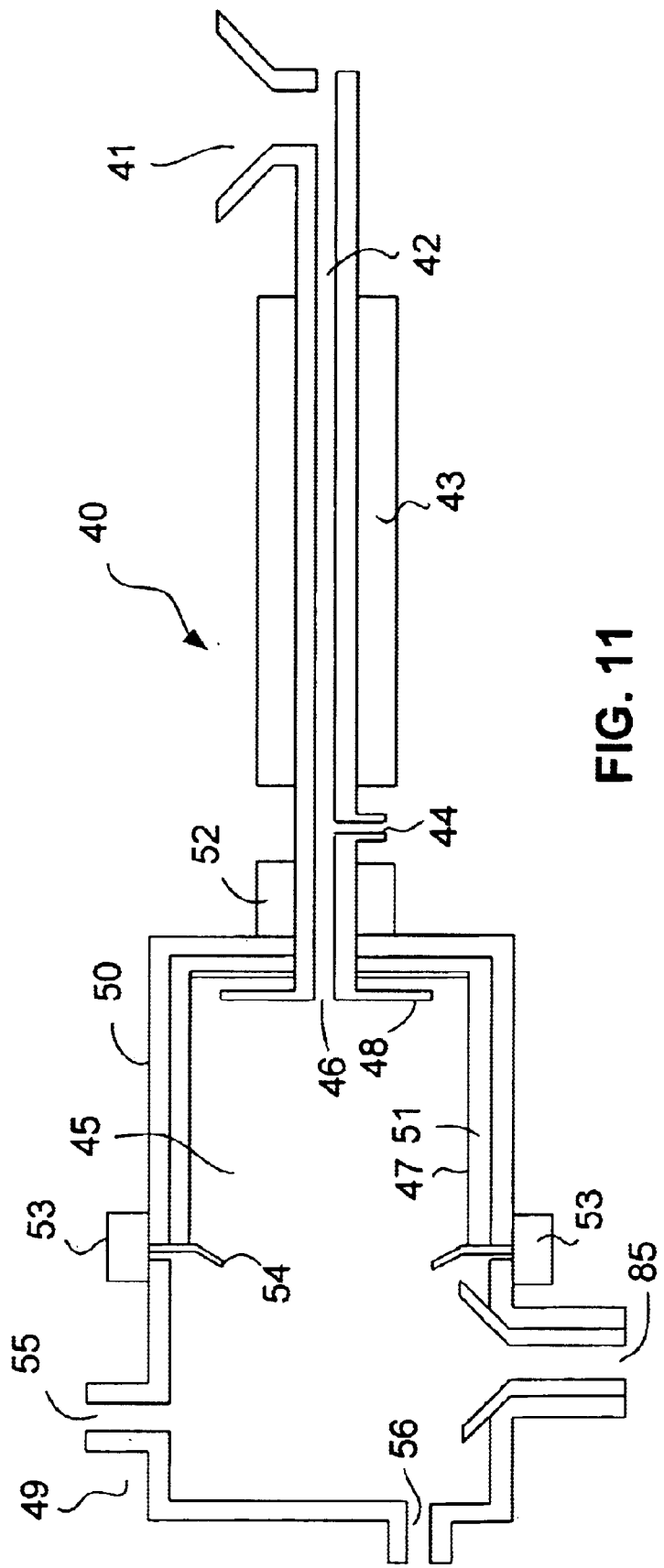

The separated rubber is typically ground before passing to a microwave reactor. FIG. 11 illustrates a preferred microwave reactor 40. The reactor has a hopper feed inlet 41 for receiving ground rubber into an auger driven feed pipe 42. The feed pipe 42 feeds the rubber through an infra red pre heating chamber 43 which preheats the rubber to between about 90 to about 120° C. The preheating chamber has an outlet port 44 which removes any volatile materials under vacuum. These volatile materials may be recycled to the softening step or may be isolated for other uses. Typically, gas is first vacuumed off, followed by light, medium and heavy oils. At high temperatures sulfur and zinc oxides are vaporized from the carbon. They may be isolated and stored for further use. Zinc oxide may be used as a vulcanizing agent, a source of zinc and has applications in the paint industry. Sulfur oxide may be used in the production of further rubber products.

The reactor 40 has a microwave chamber 45. The chamber 45 has an inlet 46 for receiving the pre-heated rubber. A heat shield 48 is located immediately inside the chamber 45 from inlet 46.

The chamber 46 has two sections 47, 49. The first section extends from the inlet 46 and has an outer stainless steel wall 50 and an inner wall of alumina, which is capable of withstanding high temperatures in the microwave. The first section 47 is mounted for rotation via bearing 52. At the end of the first section 47 is located further bearings and a microwave seal 53. The chamber 45 also includes inwardly facing disc 54 extending from the end of the first section. This disc retains material in the first section during rotation thereof.

The chamber 45 includes a microwave inlet port 55, a vacuum outlet port 56 for removal of volatile materials and an outlet 58 for removal of solid carbon product. If desired the carbon product may be acid washed and/or subjected to size reduction in a micronozer to a size suitable for the carbon black market.

A test was run to recover products from a used vehicle tire using the process of the present invention. A used vehicle tire was debeaded and sliced. The sliced segments were soaked in a solution of 80% oil and 20% aromatic hydrocarbon solvent. The oil was a 50:50 mixture of waste engine oil and oil obtained as a product of microwaving a tire treated by the process of the invention. The sliced tire was soaked for a period of 2–4 hours. The softened tire was then subjected to a shearing by the separator. To separate the tire rubber from the steel belts and fibers. The separated rubber was then ground to provide a course grade (cm particle size) and a fine grade (mm particle size).

An investigation was made to the dielectric properties of these tire crumbs which include the dielectric constant and the loss factor. These properties can be used to determine the microwave absorption level, the microwave power required, the penetration depth a, bed depth and the rate of temperature rise.

The microwave absorption properties and the penetration depth were obtained from the dielectric properties which consist of the dielectric constant and the loss factor at the microwave frequency used either 2450 MHz or 922 MHz. When the physical properties such as the specific gravity are obtained from the dielectric properties, the temperature rise at a power level of 1 kW can be calculated.

The specific gravity was determined by the weight over volume displacement method. The specific heat was determined using a known sample of distilled water at a known temperature. A known rubber samples at known temperature was then added to the water to obtain the resultant temperature. From the mass of water and rubber and their initial and final temperatures, the specific heat for rubber was calculated.

The microwave dielectric properties were determined using an open probe with a calibrated network analyzer. The network analyzer is calibrated with three known impedance's to remove any inherent system errors prior to the determination of the dielectric properties.

The recovery of carbon and oil from the rubber was carried out using a 1.2 kW microwave source at 2450 MHz and a vacuum chamber, which could have a vacuum better than about 10 mm of Hg.

A crumb sample of 300 g was placed in the chamber and tuned at low power to the microwave source to better than 5% reflection before high power was applied. The released vapor was condensed to obtain oil and the solid residue was left in the chamber. The sold was subjected to a TGA (Themro Gravimetric Analysis) to determine the unburnt residue. The oil was analyzed to determine its components and the activated carbon was assessed by measuring the surface area of some carbon particles.

The microwave properties of the crumbs are summarized in the following Table.

| Frequency (MHz) | Dielectric Constant | Loss Factor | Penetration (mm) | Pabs (kW/m$^3$) | Temperature Rate (° C./s) |
|---|---|---|---|---|---|
| 922 | 13.5 | 2.5 | 76 | 18238 | 20.4 |
| 2460 | 10.2 | 1.7 | 36.5 | 30016 | 36.9 |

It was observed that the temperature rate of rise was impressively high when compared to raw tire rubber crumb which had not been subjected to the softening and separation steps of the present invention. The dielectric properties of a sample of a conventional rubber tire crumb are summarized in the following Table.

| Material | Dielectric constant | Loss Factor | Penetration (mm) | Pabs (kW/m$^3$) | Temperature Rate (° C./s) |
|---|---|---|---|---|---|
| Tread | 15.1 | 0.9 | 84 | 17377 | 6.2 |
| Side | 10.9 | 0.3 | 214 | 5792 | 2.1 |

It can be seen that the temperature rise for the rubber obtained by the process of the invention has a significantly higher temperature rise than normal rubber. This significant increase in temperature rise means that this material is particularly suited to microwave heating in an efficient manner.

The course and fine rubber crumbs were subjected to microwave radiation at both 922 Mhz and 2450 Mz with 500W power for a period of 55 minutes under a vacuum of between about 50 and about 70 mmHg. The volatile products were condensed at either ambient water temperature of about 12° C. or at about ice temperature. The products obtained at ambient temperature were 47% oil, 38% solid and 14.3% gas. The products obtained at ice temperature were oil 49%, solid 38.3 solid and 12% gas.

The solid components were found to have a carbon content of 97.3%.

The oil from ambient and ice temperature condensation were analyzed by GCMS and found to have two prominent peaks. The most prominent peak was identified as limonene at about 37%. The oil conglomerates are all good burning oil with calorific values of 42.5 MJ/Kg for oil condensed at ambient temperature and 38 MJ/Kg for oil condensed at ice temperature. These values compare well with typical values for calorific fuels. For example fuels oil and diesel oil have calorific values of 41 and 45 MJ/Kg respectively. Coals has calorific values ranging from 10 MJ/Kg for low rank coals to 31 MJ/Kg for coking coal.

It can be seen that the oil distilled from the tires can make an ideal fuel. Further, if desired the oil may be further treated by known methods to isolate limonene which is a major constituent of oil of lemon.

Several tests were carried out to determine the microwave power required to distillate two tonnes of tire rubber per hour. From the microwave properties, the physical properties of crumbs and the microwave test results, it is concluded that the minimum power requirement is 1 W/h-hour. Translating into a 2 tonnes/hour, the energy requirement is 2 MW-hour. It will be appreciated that this energy requirement may be further reduced by incorporating a pre-heating step as described above and other variables of microwave reactors such as tuning and insulation.

The oil extracted was 47%. The density is greater than 1, which means that in every tonne of crumbs, there are 470 kgs of oil. At 42 MJ/kg, this oil contains 1 9740 MJ. When the process uses 1 MW-hour for one tonne/hour in energy terms it uses 3600 MJ. Therefore the oil produced offsets this input energy by a ratio of 1 9740/3600=5.5:1.

It will be appreciated that in view of the excellent temperature rise properties, rubber obtained by the method of the present invention can be distilled by using significantly less microwave energy than that required for distilling conventional used tire crumb. Thus, the present invention enables the distillation of tires by microwave radiation to be an economically viable process. Still further, the process products valuable material such as oil which may be used as fuel, recycled to the soaking step or further purified to obtain purified commercial products. The carbon obtained is also of a high degree of purity. This product may be used in many applications such as carbon black, production of activated carbon, foundry carbon, absorbers, shingles, buckyballs, evapotrasnspirators and fire resistant products.

In summary the embodiments of the invention can enable articles such as used tires to be treated in an energy efficient manner to separate the tire components such as rubber, metal and fiber. The invention also provides for an energy efficient method of reclaiming the rubber and also for destructive distillation of the rubber to provide valuable products such as carbon, and fuel oil.

It can be appreciated that the present invention can provide an integrated tire recycling system to recycle motor vehicle tires by a specially designed Several tests were carried out to determine the microwave power required to distillate two tonnes of tire rubber per hour. From the microwave properties, the physical properties of crumbs and the microwave test results, it is concluded that the minimum power requirement is 1 W/h-hour. Translating into a 2 tonnes/hour, the energy requirement is 2 MW-hour. It will be appreciated that this energy requirement may be further reduced by incorporating a pre-heating step as described above and other variables of microwave reactors such as tuning and insulation.

The oil extracted was 47%. The density is greater than 1, which means that in every tonne of crumbs, there are 470 kgs of oil. At 42 MJ/kg, this oil contains 1 9740 MJ. When the process uses 1 MW-hour for one tonne/hour in energy terms it uses 3600 MJ. Therefore the oil produced offsets this input energy by a ratio of 1 9740/3600=5.5:1.

It will be appreciated that in view of the excellent temperature rise properties, rubber obtained by the method of the present invention can be distilled by using significantly less microwave energy than that required for distilling conventional used tire crumb. Thus, the present invention enables the distillation of tires by microwave radiation to be an economically viable process. Still further, the process products valuable material such as oil which may be used as fuel, recycled to the soaking step or further purified to obtain purified commercial products. The carbon obtained is also of a high degree of purity. This product may be used in many applications such as carbon black, production of activated carbon, foundry carbon, absorbers, shingles, buckyballs, evapotrasnspirators and fire resistant products.

In summary the embodiments of the invention can enable articles such as used tires to be treated in an energy efficient manner to separate the tire components such as rubber, metal and fiber. The invention also provides for an energy efficient method of reclaiming the rubber and also for destructive distillation of the rubber to provide valuable products such as carbon, and fuel oil.

It can be appreciated that the present invention can provide an integrated tire recycling system to recycle motor vehicle tires by a specially designed method to be able to extract the raw materials from tires (which are the building blocks of such tires) in an organized way to be suitable for several value-added by-products, reclaiming all parts of a tire (or any other article made up of rubber). This is a very important aspect of this recycling technique. This invention comprises several innovations obviously demanded by this very problematic waste that is full of beneficial recoverable resources.

Throughout the specification and claims, if present, unless the context requires otherwise, the word "comprise" or variations such as "comprises" or comprising" or the term "includes" or variations thereof will be understood to imply the inclusion of a stated element or integer or group of integers but not the exclusion of any other element or integer or group of integers.

It will be appreciated that various changes and modifications may be made to the invention and embodiments thereof as described herein without departing from the spirit and scope thereof.

What is claimed is:

1. A method of recovering elastomeric material from an article containing the material, the method including softening the elastomeric material by contacting the article with a fluid comprising at least one oil in admixture with at least one volatile solvent to soften the elastomeric material and subjecting the softened material to a shearing force in a shearing means having at least two pairs of counter-rotating rollers wherein said pairs of counter-rotating rollers are disposed one above the other and each pair of counter-rotating rollers is formed from rollers mounted for counter-rotation and having opposed, spirally configured flights and wherein each pair of counter-rotating rollers has a gap therebetween wherein said gap between a pair of counter-rotating rollers disposed above another pair of counter rotating rollers is greater in size than the gap of said another pair of counter-rotating rollers.

2. The method of claim 1, wherein the at least one oil is selected from the group consisting of engine oil, coal oil, fuel oil, paraffin oil, mineral oil and oil derived from destructive distillation of an elastomeric material.

3. The method as claimed in claim 1 wherein the at least one solvent is selected from hydrocarbons, nitrohydrocarbons, alcohols, ethers, ketones, esters, glycols and glycol ethers, cycloalkyl alcohols, esters and ketones, chlorinated hydrocarbons, cyclic ethers and aldehydes and mixtures thereof.

4. The method as claimed in claim 3 wherein said at least one fluid is selected from toluene or xylene.

5. The method of claim 1, wherein the fluid comprises between about 50 to about 90 vol % oil.

6. The method of claim 5, wherein the fluid comprises between about 60 to about 80 vol % oil.

7. The method as claimed in claim 1 wherein said elastomeric material is selected from synthetic rubber, natural rubber, modified rubber, vulcanized rubber and mixtures thereof.

8. The method as claimed in claim 1 wherein said article comprises reinforced vehicle tires.

9. The method of claim 1, wherein the article is placed in a closed vessel containing the fluid, the vessel has an inlet at a first end and an outlet at a second end and the article passes through the vessel from the inlet to the outlet for a time sufficient to soften the elastomeric material.

10. The method of claim 1, wherein, after shearing the softened material is subjected to a grinding step which reduces the particle size.

11. The method of claim 10, wherein the fluid is at least partially removed from the softened material by subjecting the material to microwave radiation sufficient to at least partially evaporate the fluid.

12. The method of claim 11, wherein by a process of heating the elastomeric material, the fluid is evaporated and in the process leaves the molecular structure of the elastomeric material in an expanded state.

13. The method of claim 11, wherein a process of heating the elastomeric material using microwave energy weakens the molecular bond of the elastomeric material by a process called depolymerization.

14. The method of claim 11, comprising the further step of blending the elastomeric material with the oils and heating the elastomeric material under pressure by subjecting the elastomeric material to microwave radiation or an alternate method of heating sufficient to cause repolymerisation of the elastomeric material in an apparatus comprising a rotatable chamber having a first inlet means and a first outlet, means to allow elastomeric material to enter into and exit from said chamber, second inlet means to allow microwave radiation to enter into said chamber, and second outlet means to allow liberated vapours/gases to be removed from said chamber, wherein the vapours and gasses are condensed to obtain an oil and the oil is recycled, wherein the elastomeric material is repolymerised.

15. The method of claim 14, wherein the resulting product is an elastomeric material with a Shore Å hardness of about 60.

16. The method of claim 11, wherein said elastomeric material is further sized to a uniform particle size.

17. The method of claim 1 comprising the further step of carbonizing the elastomeric material by subjecting it to microwave radiation sufficient to cause carbonization of the elastomeric material.

18. The method of claim 1 comprising the further step of carbonizing the elastomeric material by subjecting the elastomeric material to microwave radiation sufficient to cause carbonization of the elastomeric material in an apparatus comprising a rotatable chamber having a first inlet means and a first outlet, means to allow elastomeric material to enter into and exit from said chamber, second inlet means to allow microwave radiation to enter into said chamber, and second outlet means to allow liberated vapours/gases to be removed from said chamber.

19. The method of claim 18, wherein the elastomeric material retains at least some of the fluid which can create a dipole moment in the elastomeric material.

20. The method of claim 19, wherein the elastomeric material is preheated before entering the microwave chamber.

21. The method of claim 20, wherein the material is preheated to a temperature between about 80 to about 150° C.

22. The method of claim 21, wherein the material is carbonized at a temperature of about 1300° C.

23. The method of claim 18,
wherein the vapours and gasses are condensed to obtain an oil and the oil is recycled to the admixture of the at least one oil and the at least one volatile solvent for softening further elastomeric material.

24. The method of claim 18, wherein the vapor/gasses include sulfur oxide and zinc oxide and the sulfur and zinc oxide are condensed and isolated.

25. An apparatus for recovering elastomeric material from an article containing an elastomeric material, the apparatus including a closed vessel containing a fluid which can absorb into and soften the elastomeric material, the vessel having a first end having an inlet and a second end having an outlet, whereby the article passes from the inlet to the outlet for a time sufficient to soften the elastomeric material and a shearing means having at least two pairs of counter-rotating rollers wherein said pairs of counter rotating rollers are disposed one above the other and each pair of counter-rotating rollers is formed from rollers mounted for counter-rotation and having opposed, spirally configured flights and wherein each pair of counter-rotating rollers has a gap therebetween wherein said gap between a pair of counter-rotating rollers disposed above another pair of counter rotating rollers is greater in size than the gap of said another pair of counter-rotating rollers.

26. The apparatus of claim 25, which includes four pairs of rollers.

27. The apparatus of claim 26, wherein the uppermost pair of rollers has a gap between the rollers of between about 6 to about 7 mm and the lowermost pair of rollers has a gap of less than 1 mm.

28. The apparatus of claim 25, wherein each roller has a first section in which the flight directs material in a first direction along the roller and a section in which the flight directs material in the opposite direction to the first direction.

* * * * *